United States Patent Office 3,107,825
Patented Oct. 22, 1963

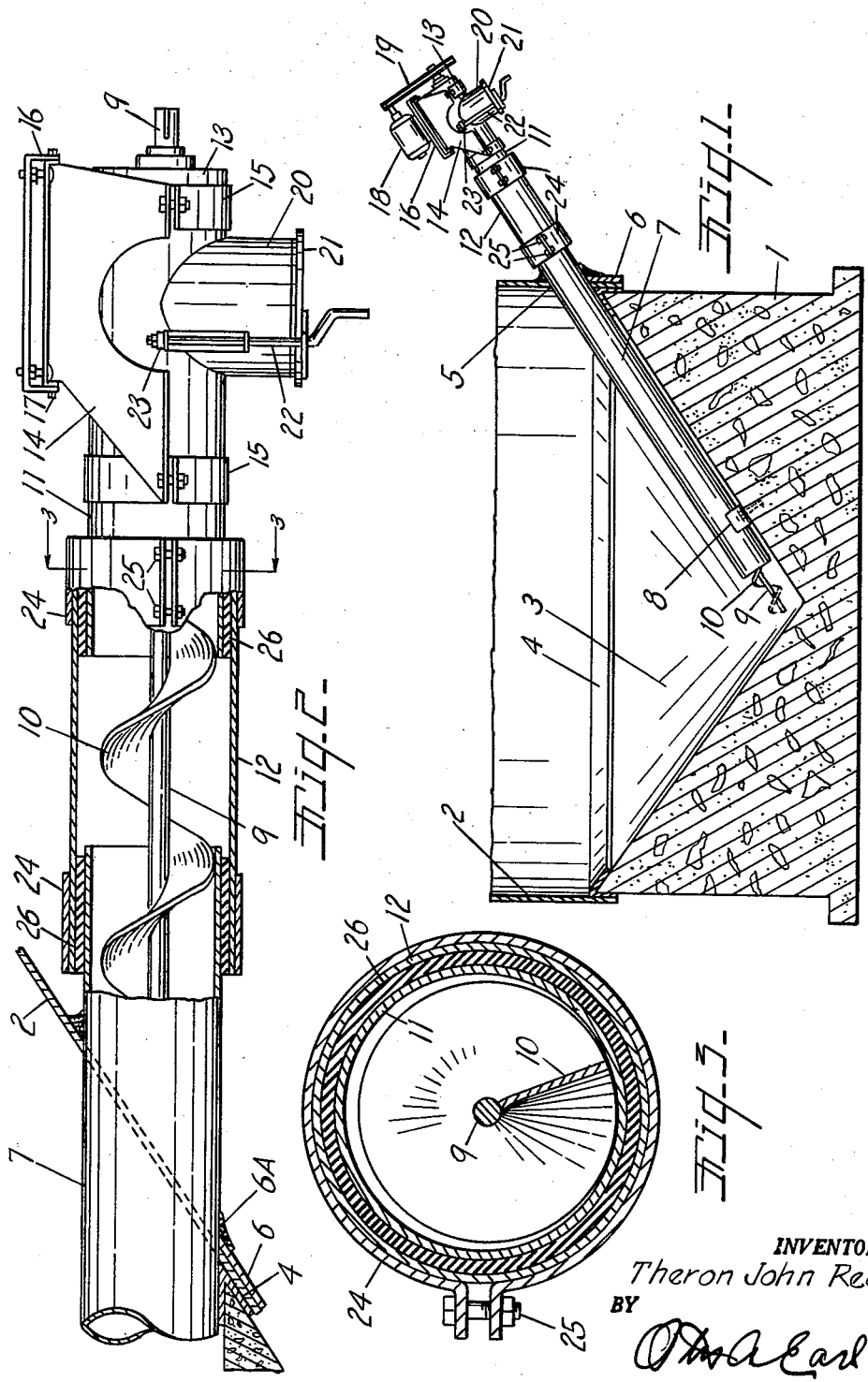

3,107,825
VARIABLE FLOW FEED AUGER FOR DELIVERING FROM SEALED STORAGE BINS
Theron John Reed, Burr Oak, Mich., assignor to Paul W. Sindlinger and John R. Nichols, Indianapolis, Ind.
Filed June 2, 1961, Ser. No. 114,420
4 Claims. (Cl. 222—310)

This invention relates to improvements in variable flow feed auger for delivering from sealed storage bins. The invention disclosed herein is an improvement and variation of the copending application Serial No. 17,901, filed March 28, 1960, now Patent No. 3,057,522, for Variable Feed Auger for Delivery From Storage Bins. The principal objects of this invention are:

First, to provide a light inexpensive delivery auger which can be mounted on and sealed to the wall of a hermetically sealed silo to deliver high moisture content grain from the silo at variable rates with a constant speed driving motor.

Second, to provide novel means for adjustably and sealably mounting a screw auger through the side wall of a silo so that the auger will project different distances into the silo for delivering different rates of flow of material from the silo with a constant speed motor.

Third, to provide a novel form of delivery auger mounting having the above mentioned variable delivery characteristics which can be effectively hermetically sealed when not in use to maintain the moisture content of high moisture grains in a sealed silo.

Other objects and advantages of the invention will be apparent from a consideration of the following description and claims. The drawings, of which there is one sheet, illustrate a highly practical form of the invention.

FIG. 1 is a fragmentary vertical cross sectional view through the base of a sealed silo with the delivery conveyor auger of the invention operatively mounted therein.

FIG. 2 is a fragmentary longitudinal cross sectional view through the delivery conveyor and the adjustable mounting for the feed screw thereof.

FIG. 3 is a transverse cross sectional view through one of the seals of the adjustable auger mounting taken along the plane of the line 3—3 in FIG. 2.

It has recently been found to be advantageous for farmers to store certain grains such as corn with their whole natural moisture content in hermetically sealed storage silos and bins. Grains thus stored can be removed later in their moist condition and fed to livestock without grinding and this results in a substantial saving to the farmer provided that the moist grain can be removed from the silo in the desired quantities for feeding without destroying the sealed condition of the silo or bin. In withdrawing grain from a sealed bin, the farmer may desire to withdraw grain at different rates of speed depending upon the amount to be withdrawn and the means available to accept and carry away the grain delivered. In order to provide mechanism for withdrawing moist grains from a sealed storage bin or silo at selectively variable rates of delivery and with a minimum of expense for the equipment involved, the present invention provides a delivery conveyor capable of achieving the above mentioned objectives.

FIG. 1 conventionally illustrates the base 1 of an upright cylindrical silo having a side wall 2. The base has an upwardly concave, conical recess 3 in its center with a circular mounting band 4 of angular cross section mounted around the upper edge thereof and to which the side wall 2 is suitably sealed. The side wall defines an elliptical delivery opening 5 just above the rim 4 and a saddle plate or bracket 6 is mounted on the side wall below the opening 5 to support the outer end of a delivery tube 7. The tube is anchored at its lower end to the conical surface of the base as at 8 and terminates approximately 18 inches above the apex of the conical recess 3. When installed in the silo the periphery of the tube 7 is hermetically sealed to the side wall 2 by a suitable seal indicated at 6A.

An elongated drive shaft 9 having a feed screw or auger 10 mounted therearound projects downwardly through the tube 7 and upwardly beyond the outer end of the tube.

The shaft 9 and screw auger 10 are directly rotatably mounted and supported in an extension tube 11 secured in coaxial alignment with the tube 7 by a sleeve 12. The tube extension 11 has a suitable bearing 13 for the end of the drive shaft 9 and is provided with a motor supporting platform or bracket 14 secured on the top of the extension tube by bands 15 clamped around the tube. The motor supporting bracket carries a platform 16 hinged at 17 to adjustably support the electric motor 18 so that a belt 19 connected between the shaft of the motor and the shaft 9 will drive the shaft at a fixed speed with a minimum of supporting and connecting mechanism.

Grain delivered upwardly through the delivery tube 7 and sleeve 12 to the extension tube 11 is discharged through an angularly disposed discharge tube 20 opening from the lower side of the extension tube 11. When the delivery conveyor is not in operation a closure and seal plate 21 is clamped over the end of the discharge tube by a holding and clamping screw 22 adjustably engaged with a fixed bracket 23 on the side of the extension tube.

In order to increase or decrease the rate of delivery of grain from the bin without adjusting the speed of the motor 6 or the driving ratio to the shaft 9, the tube extension 11 and the drive shaft 9 carried thereby can be adjusted axially of the delivery tube 7 by telescopically adjusting the end of the tube extension within the sleeve 12. This causes the lower end of the screw auger 10 to project different distances below the delivery tube 7 and the more the projection of the screw into the bin, the greater the rate of delivery through the tubes 7 and 11. The sleeve 12 is releasably clamped to the adjacent ends of the tube 7 and tube extension 11 by split clamp rings 24 adjustably tightened in place between clamp bolts 25. In order to prevent leakage of air into or out of the sealed bin particularly during prolonged periods of disuse of the delivery auger 10, the ends of the sleeve 12 have rubber or other deformable seals 26 bonded therein and these cylindrical seals are clamped in sealing relation to the ends of the tube 7 and the tube extension 11 by the clamp rings 24 just described. The length of the connecting and sealing sleeve 12 is such that the tube extension 11 and the drive shaft 9 and screw carried thereby may be adjusted to vary the projection of the lower end of the screw into the bin between 3 to 18 inches. Normally a minimum of 3 inches of the screw 10 projects below the lower end of the delivery tube 7 in the most retracted position of the tube extension 11 and the shaft driving power unit 18. It will readily be recognized wherein the screw described will perform the operation of withdrawing moist grains from the silo at different rates to accomplish the objectives set out at the beginning of the specification with a minimum of mechanism and therefore at a minimum of expense.

What is claimed as new is:

1. In combination with a silo adapted to be hermetically sealed and having a concave conical base with a side wall projecting thereabove and defining a hole adjacent the top of the base, a delivery tube anchored to said base and projecting in sealed relation through said hole and extending to about 18 inches from the bottom of said base, a sleeve having deformable seals in its ends clamped to the outer end of said tube, an extension tube projecting adjustably into the seal at the outer end of said sleeve and releasably clamped thereto, a discharge tube opening laterally from said extension tube, means mounted on said extension tube arranged to clamp a closure in sealing relation to the end of said discharge tube, a conveyor drive shaft journaled in said extension tube and projected through the ends thereof and through the lower end of said delivery tube, a motor mounted on said extension tube and connected to drive said drive shaft at constant speed, and an auger screw on said drive shaft arranged to project at its lower end at variable distances from the lower end of said delivery tube depending on the adjustment of said extension tube and sleeve relative to said delivery tube.

2. In combination with a silo adapted to be hermetically sealed and having a concave base with a side wall projecting thereabove and defining a hole adjacent the top of the base, a delivery tube anchored to said base and projecting in sealed relation through said hole and extending to about 18 inches from the bottom of said base, a sleeve having deformable seals in its ends clamped to the outer end of said tube, an extension tube projecting adjustably into the seal at the outer end of said sleeve and releasably clamped thereto, a discharge tube opening laterally from said extension tube, means mounted in sealing relation to the end of said discharge tube, a conveyor drive shaft journaled in said extension tube and projected through the lower end of said delivery tube, a motor mounted on said extension tube and connected to drive said drive shaft at constant speed, and an auger screw on said drive shaft arranged to project at its lower end at variable distances from the lower end of said delivery tube depending on the adjustment of said extension tube and sleeve relative to said delivery tube.

3. In combination with a bin adapted to be hermetically sealed and having a side wall defining a hole adjacent the bottom of the wall, a delivery tube projecting in sealed relation through said hole, a sleeve having deformable seals around its ends clamped in releasable and slidably adjustable relation to the outer end of said tube, an extension tube projecting adjustably from the seal at the outer end of said sleeve and releasably clamped to the sleeve, a discharge tube opening laterally from said extension tube, releasable cover means mounted in sealing relation to the end of said discharge tube, a conveyor drive shaft journaled in said extension tube and projected through the inner end of said delivery tube, a motor mounted on said extension tube and connected to drive said drive shaft at constant speed, and an auger screw on said drive shaft arranged to project at its inner end at variable distances from the inner end of said delivery tube depending on the adjustment of said extension tube and sleeve relative to said delivery tube.

4. In combination with a bin adapted to be hermetically sealed and having a base with a side wall projecting thereabove and defining a hole adjacent the base, a delivery tube anchored to said base and projecting in sealed relation through said hole, an extension tube projecting adjustably from the outer end of said delivery tube, means sealing said extension tube to said delivery tube, a discharge tube opening laterally from said extension tube, means arranged to clamp a closure in sealing relation to the end of said discharge tube, a conveyor drive shaft journaled in said extension tube and projected through the ends thereof and through the inner end of said delivery tube, a motor mounted on said extension tube and connected to drive said drive shaft at constant speed, and an auger screw on said drive shaft arranged to project at its inner end at variable distances from the inner end of said delivery tube depending on the adjustment of said extension tube relative to said delivery tube.

References Cited in the file of this patent

UNITED STATES PATENTS

| | | |
|---|---|---|
| 2,055,725 | Johnson | Sept. 29, 1936 |
| 2,292,934 | Fitch | Aug. 11, 1942 |
| 2,586,537 | Hapman | Feb. 19, 1952 |
| 2,931,522 | Sullivan | Apr. 5, 1960 |